(12) United States Patent
Kekki et al.

(10) Patent No.: US 12,595,038 B2

(45) Date of Patent: Apr. 7, 2026

(54) PROPULSION UNIT FOR A MARINE VESSEL

(71) Applicant: ABB Oy, Helsinki (FI)

(72) Inventors: Tuomas Kekki, Helsinki (FI); Petri Pellinen, Helsinki (FI); Sakari Siipilehto, Helsinki (FI); Tuomas Herranen, Helsinki (FI); Antti Tuppurainen, Helsinki (FI)

(73) Assignee: ABB Oy, Helsinki (FI)

(*) Notice: Subject to any disclaimer, the term of this patent is extended or adjusted under 35 U.S.C. 154(b) by 798 days.

(21) Appl. No.: 17/810,712

(22) Filed: Jul. 5, 2022

(65) Prior Publication Data

US 2023/0002024 A1     Jan. 5, 2023

(30) Foreign Application Priority Data

Jul. 5, 2021    (EP) ..................................... 21183627

(51) Int. Cl.
B63H 21/38 (2006.01)
B63H 23/32 (2006.01)
(Continued)

(52) U.S. Cl.
CPC ......... B63H 21/386 (2013.01); B63H 23/321 (2013.01); B63H 23/34 (2013.01);
(Continued)

(58) Field of Classification Search
CPC .... B63H 21/386; B63H 23/321; B63H 23/34; B63H 2005/1258; B63H 2023/327;
(Continued)

(56) References Cited

U.S. PATENT DOCUMENTS

| | | | | |
|---|---|---|---|---|
| 3,561,524 A | * | 2/1971 | Satterthwaite | ........ F28F 9/0221 |
| | | | | 165/44 |
| 5,643,026 A | * | 7/1997 | Pietsch | .................. F16J 15/004 |
| | | | | 277/927 |

(Continued)

FOREIGN PATENT DOCUMENTS

| | | | | |
|---|---|---|---|---|
| CN | 112520000 A | * | 3/2021 | |
| DE | 102009011289 A1 | | 9/2010 | |

(Continued)

OTHER PUBLICATIONS

Wartsila encyclopedia, https://www.wartsila.com/encyclopedia/term/electric-podded-propulsor (wayback machine date Feb. 1, 2020), Electric Podded Propulsor, Image "Podded Propulsor Dolphin" (Year: 2020).*

(Continued)

Primary Examiner — S. Joseph Morano
Assistant Examiner — Eric Anthony Starck
(74) Attorney, Agent, or Firm — Whitmyer IP Group LLC

(57) ABSTRACT

A propulsion unit for a marine vessel, including a shell structure, a shaft rotatably coupled to a propulsion motor inside the shell structure, and a propeller coupled to the shaft outside the shell structure. A shaft seal arrangement is provided to engage the shaft, such that at least a first seal chamber is delimited between adjacent seal lips and the shaft. A first lubrication arrangement is provided for circulating a first lubricant through the first seal chamber. The first lubrication arrangement further includes a first lubricant heat exchanger arranged at least partly outside of the shell structure for conducting the first lubricant therethrough and for transferring heat from the first lubricant to an outside environment of the shell structure.

15 Claims, 5 Drawing Sheets

(51) Int. Cl.
    *B63H 23/34*            (2006.01)
    *F16H 57/04*            (2010.01)
    *F28D 1/02*             (2006.01)

(52) U.S. Cl.
    CPC ..... *F16H 57/0412* (2013.01); *F16H 57/0415*
           (2013.01); *F16H 57/0436* (2013.01); *F16H*
           *57/0472* (2013.01); *F28D 1/022* (2013.01)

(58) Field of Classification Search
    CPC .......... B63H 23/36; B63H 5/125; B63H 5/10;
           B63H 21/17; B63H 1/14; B63H
           2005/106; B63H 2023/322; B63H
           2023/325; B63H 2023/342; B63H 23/326;
           B63H 1/12; B63H 1/16; B63H 1/28;
           B63H 2001/122; B63H 2001/127; B63H
           2001/165; B63H 21/32; B63H 21/34;
           B63H 21/36; B63H 21/383; B63H 1/20;
           B63H 2005/1254; B63H 23/04; B63H
           23/24; B63H 25/00; B63H 25/42; B63H
           25/48; F16H 57/0412; F16H 57/0415;
           F16H 57/0436; F16H 57/0472; F16J
           15/324; F16J 15/3232; F16J 15/54; B63J
           2/12; F16N 29/02; F16N 2210/06; F16N
           2250/04; F16N 2250/08; F16N 2270/00;
           F28D 9/00
    USPC ............................................. 440/88 L, 88 HE
    See application file for complete search history.

(56) References Cited

U.S. PATENT DOCUMENTS

| | | | |
|---|---|---|---|
| 2003/0000444 A1* | 1/2003 | Tsuboguchi | ........... B63H 5/125 |
| | | | 114/162 |
| 2009/0226298 A1* | 9/2009 | Kajiyama | ............... F04C 14/02 |
| | | | 415/65 |
| 2013/0300065 A1* | 11/2013 | Palokangas | ............ F16J 15/006 |
| | | | 277/309 |
| 2014/0048461 A1* | 2/2014 | Wrage | .................. F16J 15/3232 |
| | | | 210/167.02 |
| 2017/0211572 A1* | 7/2017 | Jeong | ................... F04C 15/008 |
| 2019/0011050 A1 | 1/2019 | Vincent | |

FOREIGN PATENT DOCUMENTS

| | | | | |
|---|---|---|---|---|
| EP | 3015358 A1 * | 5/2016 | .......... | B63H 23/321 |
| GB | 2093538 A | 9/1982 | | |
| JP | 2014177986 A * | 9/2014 | | |
| KR | 1020170069278 A | 6/2017 | | |
| WO | 2012085325 A1 | 6/2012 | | |

OTHER PUBLICATIONS

Chinese Office Action; Application No. 2022107879052; Completed Apr. 26, 2024; 18 Pages.
Extended European Search Report; Application No. EP 21 18 3627; Issued: Dec. 23, 2021; 2 Pages.

* cited by examiner

PROPULSION UNIT FOR A MARINE VESSEL

TECHNICAL FIELD

The present disclosure relates to propulsion unit for marine vessels, and more particularly to a shaft seal arrangement for such a propulsion unit.

BACKGROUND

The propeller shaft of a marine propulsion unit needs to be sealed such that surrounding water does not enter into the structure surrounding the propeller shaft via the interface therebetween. Conventionally, shaft seals are provided with at least a seal lip pressing against the propeller shaft for ensuring a sufficient seal. Typically, such seal lips are shaped so that environmental hydrostatic pressure exerts a radial force on the seal lip such that it is firmly pressed against the propeller shaft. To prevent such radial forces from becoming too great, and consequently resulting in excess wear, multiple seal lips have been provided, such that corresponding seal chambers are formed between axially adjacent seal lips. Such seal chambers allow a gradual change in pressure from the hydrostatic pressure prevailing outside the structure from which the propeller protrudes from to the pressure prevailing within said structure. Consequently, each seal lip needs to seal against only a portion of the total pressure difference, resulting smaller radial forces and increased longevity of the seal. Furthermore, if multiple such seal chambers are provided, conventional arrangements may have included a lubricant introduced into inner seal chambers. In such a case, an air pressure is typically introduced into an intermediate or outer seal chamber so as to prevent lubricant contamination.

Generally, it has been considered that the water surrounding the structure from which the propeller protrudes from provides a sufficient cooling for any frictional heat caused by the seal lip(s) pressing against the rotating propeller shaft. It has now been surprisingly discovered that the seal lips may nevertheless reach temperature levels exceeding those allowed based on their material properties, thereby leading to premature wear.

SUMMARY

An object of the present disclosure is to provide a propulsion unit equipped with a shaft seal arrangement which provides for more efficient cooling of seal lips thereof.

The object of the disclosure is achieved by a propulsion unit which is characterized by what is stated in the independent claims. The preferred embodiments of the disclosure are disclosed in the dependent claims.

The disclosure is based on the idea of providing a lubricant flow through seal chambers formed between axially adjacent seal lips. More particularly, this lubricant flow is conducted via a heat exchanger, which is at least partially exposed to the environment surrounding a shell structure of the propulsion unit. Consequently, the lubricant is used to carry excess heat from the seal chambers and transfer it to the surrounding environment.

An advantage of the method and arrangement of the disclosure is that a simple solution for efficient cooling is achieved.

According to a first aspect of the present disclosure, a propulsion unit, such as an azimuthing propulsion unit, for a marine vessel, is provided. The propulsion unit comprises a shell structure mountable below a hull of an associated marine vessel, such that the shell structure is at least partially immersed in water, when in use. Most suitably, the propulsion unit is fully immersed in water, when in use.

The propulsion unit further comprises a shaft extending between an inside and an outside of the shell structure through an opening provided thereat and a propeller coupled to the shaft outside the shell structure so as to be rotatable by the shaft.

The propulsion unit further comprises a shaft seal arrangement for sealing an inside of the shell structure from a surrounding outside environment at the interface of the shell structure and the propeller shaft. The shaft seal arrangement, in turn, comprises a plurality of seal lips axially spaced apart from each other and engaging the outer circumference of the shaft, such that at least a first seal chamber is delimited between adjacent seal lips and the outer circumference of the shaft. In the context of this disclosure, the shaft may encompass an assembly including elements other than a shaft proper and rotating along therewith. e.g. shaft sleeve.

The propulsion unit further comprises a first lubrication arrangement, in turn, comprising a first lubricant circulator. The first lubrication arrangement further comprises a first lubricant feed line for conducting a first lubricant to the first seal chamber via the first lubricant circulator, and a first lubricant return line for conducting said first lubricant from the first seal chamber back to the first lubricant circulator. It should be noted that the first feed line and the first return line may conduct said first lubricant via additional entities not mentioned above.

Preferably, but not necessarily, the first lubrication arrangement further comprises a first lubricant reservoir for holding said first lubricant. For example, the first lubricant reservoir may be implemented as the first lubricant feed line, first lubricant return line and/or any additional flow lines associated to the first lubrication arrangement. Most suitably the first lubricant reservoir is implemented as a dedicated first lubricant tank. In such a case, the first lubricant circulator is suitably arranged to feed the first lubricant form the first lubricant tank to the first seal chamber via the first lubricant feed line. Correspondingly, the first lubricant feed line is then suitably arranged to conduct the first lubricant from the first seal chamber back to the first lubricant tank. However, it should be noted that other arrangements are also possible. For example, the first lubricant circulator may alternatively be arranged in connection with the first lubricant return line. Preferably, but not necessarily, the first lubricant circulator is provided as a pump.

Moreover, the first lubrication arrangement further comprises a first lubricant heat exchanger arranged at least partly in contact with an outside environment of the shell structure 2 for conducting the first lubricant through the first heat exchanger 7e and for transferring heat from the first lubricant to the outside environment of the shell structure. That is, when in use, the first heat exchanger is at least partly in direct contact with water in which the propulsion unit is at least partly immersed, such that excess heat carried away from the shaft seal arrangement by the lubricant can be transferred in said surrounding water. For example, the first heat exchanger may be arranged at least party outside the shell structure. For example, the first heat exchanger may be implemented as a separate dedicated component, or by arranging a part of the piping associated to the first lubrication arrangement at least partially exposed to the environment surrounding a shell structure of the propulsion unit.

It should be noted, that in the context of this disclosure, terms such as first, second third or fourth are not used imply the number or order of referred entities, but rather to distinguish them from each other, unless otherwise explicitly stated.

Preferably, but not necessarily, the propulsion unit may further comprise a propulsion motor 3 arranged within the shell structure. The propulsion motor is rotatably coupled with the shaft such that the propeller is rotatable by the propulsion motor. Most suitably, the propulsion motor is an electric motor provided with electrical power generated by a prime mover abord an associated marine vessel.

In an embodiment according to the first aspect of the present disclosure, the shaft seal arrangement may comprise a plurality of seal lips, such that additionally at least a second seal chamber is delimited between adjacent seal lips and the outer circumference of the shaft. Most suitably, the second seal chamber is then arranged axially adjacent to the first seal chamber.

The shaft seal arrangement may further comprise a second lubrication arrangement, in turn, comprising a second lubricant circulator. The second lubricant arrangement further comprises a second lubricant feed line for conducting a second lubricant to the second seal chamber via the second lubricant circulator, and a second lubricant return line for conducting said second lubricant from the second seal chamber back to the second lubricant circulator. It should be noted that the first feed line and the first return line may conduct said first lubricant via additional entities not mentioned above.

Preferably, but not necessarily, the second lubrication arrangement further comprises a second lubricant reservoir for holding said second lubricant. For example, the second lubricant reservoir may be implemented as the second lubricant feed line, second lubricant return line and/or any additional flow lines associated to the second lubrication arrangement. Most suitably the second lubricant reservoir is implemented as a dedicated second lubricant tank. In such a case, the second lubricant circulator is suitably arranged to feed the second lubricant form the second lubricant tank to the second seal chamber via the second lubricant feed line. Correspondingly, the second lubricant feed line is then suitably arranged to conduct the second lubricant from the second seal chamber back to the second lubricant tank. However, it should be noted that other arrangements are also possible. For example, the second lubricant circulator may alternatively be arranged in connection with the second lubricant return line.

Preferably, but not necessarily, the second lubricant circulator is provided as a pump.

Furthermore, the second lubricant arrangement comprises a second lubricant heat exchanger arranged at least partly in contact with the outside environment of the shell structure for conducting second lubricant through the second heat exchanger and for transferring heat from the second lubricant to the outside environment of the shell structure. That is, when in use, the second heat exchanger is at least partly in direct contact with water in which the propulsion unit is at least partly immersed, such that excess heat carried away from the shaft seal arrangement by the lubricant can be transferred in said surrounding water. For example, the second heat exchanger may be arranged at least party outside the shell structure. For example, the second heat exchanger may be implemented as a separate dedicated component, or by arranging a part of the piping associated to the second lubrication arrangement at least partially exposed to the environment surrounding a shell structure of the propulsion unit.

In an embodiment according to the first aspect of the present disclosure, the shaft seal arrangement comprises a plurality of seal lips, such that additionally at least a third seal chamber is delimited between adjacent seal lips and the outer circumference of the shaft. In such a case, the third seal chamber is suitably arranged axially adjacent to the second seal chamber.

The propulsion unit may then further comprise a pressurized medium supply line in fluid communication with the third seal chamber, such that a fluid pressure prevailing within the third seal chamber may be regulated by setting a desired pressure of the air supply line. Particularly, this enables regulating the fluid pressure prevailing in the third seal chamber so as to counteract a hydrostatic pressure prevailing outside of the shell structure of the propulsion unit. Most suitably, pressurized air is used as the medium for regulating the prevailing pressure in the third seal chamber. Advantageously, such a pressurized medium supply line is also in flow connection with the second lubricant reservoir, so as to regulate the pressure therein, most suitably accordingly with the pressure prevailing within the third seal chamber. The first lubricant reservoir may also be in flow connection with the pressurized medium supply line, suitably via a regulator for governing the pressure prevailing in the first lubricant reservoir, advantageously being lower than that prevailing in the first lubricant reservoir. The pressure prevailing in one or more of the pressurized medium supply line, second lubricant reservoir and third seal chamber may also be governed with one or more shared or common regulators.

For example, flow regulators or pressure regulators may be used as such regulators.

Such a regulator may be fed, for example, by a pressurized medium supply, such as a compressed air supply. Furthermore, such a regulator may be in fluid communication with either or both of the first lubricant reservoir or the second lubricant reservoir so as to be fed with the pressurized medium. That is, reservoir pressures prevailing within the first lubricant reservoir and the second lubricant reservoir, respectively, may be set by the pressurized medium supply, and subsequently feed the regulator used to regulate the pressure prevailing in the third seal chamber.

Moreover, such a third seal chamber may be coupled to a drainage reservoir via a drainage line, so as to drain from the third seal chamber any fluids (such as water or lubricant) leaked over from any axially adjacent seal chamber.

In an embodiment according to the first aspect of the present disclosure, the shaft seal arrangement comprises a plurality of seal lips, such that additionally at least a fourth seal chamber is delimited between adjacent seal lips and the outer circumference of the shaft. Most suitably, the fourth seal chamber is arranged axially adjacent to the third seal chamber. Furthermore, the fourth seal chamber preferably an axially outermost seal chamber, such that an axially outermost seal lip associated with the fourth seal chamber is in direct contact with surrounding water, when in use.

It should be noted that the present disclosure encompasses arrangements having further seal chambers in addition to those mentioned in connection with embodiments discussed above.

In an embodiment according to the first aspect of the present disclosure, the first heat exchanger is preferably provided upstream of the first seal chamber. This prevents any pressure losses over the first heat exchanger from increasing the pressure prevailing in the first seal chamber. Alternatively, or in addition, the first heat exchanger may be provided downstream of the first seal chamber.

In an embodiment according to the first aspect of the present disclosure, where a second lubrication arrangement is provided, the second heat exchanger is preferably provided upstream of the second seal chamber. This prevents any pressure losses over the second heat exchanger from increasing the pressure prevailing in the second seal chamber. Alternatively, or in addition, the second heat exchanger may be provided downstream of the second seal chamber.

In an embodiment according to the first aspect of the present disclosure, the first lubrication arrangement may further be equipped with a first bypass valve for selectively conducting the first lubricant flow past the first heat exchanger. This allows the first lubricant to be conducted past the first heat exchanger, e.g. in case of damage to the heat exchanger.

In an embodiment according to the first aspect of the present disclosure, where a second lubrication arrangement is provided, the second lubrication arrangement may further be equipped with a second bypass valve for selectively conducting the second lubricant flow past the second heat exchanger. This allows the first lubricant to be conducted past the first heat exchanger, e.g. in case of damage to the heat exchanger.

In an embodiment according to the first aspect of the present disclosure, a portion of the first heat exchanger outside the shell structure is arranged on an outside end surface of the shell structure facing the propeller. Such an arrangement provides protection for the first heat exchanger as the propeller guards the heat exchanger from potential collisions with external objects, such as ice. Preferably, but not necessarily, the first heat exchanger may at least partially annularly surround the propeller shaft. Preferably, but not necessarily, said portion of the first heat exchanger may at least partially be covered by a separate cowling, such as a rope guard, which further provides additional protection for the heat exchanger.

In an embodiment according to the first aspect of the present disclosure, where a second lubrication arrangement is provided, a portion of the second heat exchanger outside the shell structure is arranged on an outside end surface of the shell structure facing the propeller. Such an arrangement provides protection for the second heat exchanger as the propeller guards the heat exchanger from potential collisions with external objects, such as ice. Preferably, but not necessarily, the second heat exchanger may at least partially annularly surround the propeller shaft. Preferably, but not necessarily, said portion of the second heat exchange may at least partially be covered by a separate cowling, such as a rope guard, which further provides additional protection for the heat exchanger.

In an embodiment according to the first aspect of the present disclosure, the first lubrication arrangement may comprise a first sensor configured to produce a first sensor signal indicative of first lubricant properties. The first sensor may then be coupled to a control unit configured to adjust output flow of the first lubricant circulator based on the first sensor signal.

Preferably, but not necessarily the control unit is configured to adjust output flow of the first lubricant circulator by controlling an associated circulator motor configured to drive said first lubricant circulator. Alternatively, or in addition, a variable displacement circulator may be used and arranged to be controlled by the control unit.

For example, the first sensor may be provided as a first temperature sensor configured to produce a first sensor signal indicative of a first lubricant temperature. Most suitably, the first temperature sensor is configured to produce a first sensor signal indicative of a first lubricant temperature. Advantageously, the first temperature sensor is arranged downstream of the first seal chamber, but may alternatively be arranged upstream of the first seal chamber.

Furthermore, the control unit may advantageously be configured to increase output flow of the first lubricant circulator, if the first sensor signal indicates an excessive first lubricant temperature. Alternatively, or in addition, the control unit is advantageously configured to decrease output flow of the first lubricant circulator if the first sensor signal indicates insufficient first lubricant temperature. Such an arrangement provides for sufficient lubricant flow to ensure suitable lubrication and cooling when the temperature of the lubricant rises, and the viscosity thereof decreases. Correspondingly, excessive lubricant flow resulting in an increased seal chamber pressure and premature wearing of the seal lips is prevented when the temperature of the lubricant decreases and the viscosity thereof increases.

Such excessive or insufficient lubricant temperatures may suitably be determined based on the lubricant used and the specifications and materials of the seal arrangement. Advantageously, the output flow of the first lubricant circulator is controlled by the control unit based on the lubricant temperature in accordance with a predetermined control curve, chart or map.

As another example, the first sensor may be provided as a first pressure sensor indicative of a first lubricant pressure prevailing in the first seal chamber. Furthermore, the control unit is advantageously configured to increase output flow of the first lubricant circulator, if the first sensor signal indicates an insufficient first lubricant pressure. Alternatively, or in addition, the control unit is advantageously configured to decrease output flow of the first lubricant circulator if the first sensor signal indicates excessive first lubricant pressure. In a similar manner, also this arrangement prevents excessive lubricant pressure in the seal chamber from causing excessive wear of the seal lips, while ensuring adequate lubrication.

Again, such excessive or insufficient lubricant pressure may suitably be determined based on the lubricant used and the specifications and materials of the seal arrangement. Advantageously, the output flow of the first lubricant circulator is controlled by the control unit based on the lubricant temperature in accordance with a respective predetermined control curve, chart or map.

It also possible that both a first pressure sensor and a first temperature sensor are used simultaneously to control the first lubricant circulator.

In an embodiment according to the first aspect of the present disclosure, where a second lubrication arrangement is provided, the second lubrication arrangement may comprise a second sensor configured to produce a second sensor signal indicative of second lubricant properties. The second sensor may then be coupled to the control unit configured to adjust output flow of the second lubricant circulator based on the second sensor signal.

Preferably, but not necessarily the control unit is configured to adjust output flow of the second lubricant circulator by controlling an associated circulator motor configured to drive said second lubricant circulator. Alternatively, or in addition, a variable displacement circulator may be used and arranged to be controlled by the control unit.

For example, the second sensor may be provided as a second temperature sensor configured to produce a second sensor signal indicative of a second lubricant temperature. Advantageously, the second temperature sensor is arranged downstream of the second seal chamber, but may alternatively be arranged upstream of the second seal chamber. Furthermore, the control unit may advantageously be configured to increase output flow of the second lubricant circulator, if the second sensor signal indicates an excessive second lubricant temperature. Alternatively, or in addition, the control unit is advantageously configured to decrease output flow of the second lubricant circulator if the second sensor signal indicates insufficient second lubricant temperature. Such an arrangement provides for sufficient lubricant flow to ensure suitable lubrication and cooling when the temperature of the lubricant rises, and the viscosity thereof decreases. Correspondingly, excessive lubricant flow resulting in an increased seal chamber pressure and premature wearing of the seal lips is prevented when the temperature of the lubricant decreases and the viscosity thereof increases.

Such excessive or insufficient lubricant temperatures may suitably be determined based on the lubricant used and the specifications and materials of the seal arrangement. Advantageously, the output flow of the second lubricant circulator is controlled by the control unit based on the lubricant temperature in accordance with a respective predetermined control curve, chart or map.

As another example, the second sensor may be provided as a second pressure sensor indicative of a second lubricant pressure prevailing in the second seal chamber. Furthermore, the control unit is advantageously configured to increase output flow of the second lubricant circulator, if the second sensor signal indicates an insufficient second lubricant pressure. Alternatively, or in addition, the control unit is advantageously configured to decrease output flow of the second lubricant circulator if the second sensor signal indicates excessive second lubricant pressure. In a similar manner, also this arrangement prevents excessive lubricant pressure in the seal chamber from causing excessive wear of the seal lips, while ensuring adequate lubrication.

Again, such excessive or insufficient lubricant pressure may suitably be determined based on the lubricant used and the specifications and materials of the seal arrangement. Advantageously, the output flow of the first lubricant circulator is controlled by the control unit based on the lubricant temperature in accordance with a respective predetermined control curve, chart or map.

It also possible that both a first pressure sensor and a first temperature sensor are used simultaneously to control the first lubricant circulator.

In an embodiment according to the first aspect of the present disclosure, where a second lubrication arrangement is provided, both the first lubricant circulator and the second lubricant circulator are driven by a shared circulator motor.

It should be noted that the first aspect of the present disclosure, encompasses any combination of two or more embodiments, or variants thereof, as discussed above.

According to a second aspect of the present disclosure, a marine vessel is provided. Particularly, the marine vessel comprises one or more propulsion units according to the first aspect of the disclosure, as discussed above.

BRIEF DESCRIPTION OF THE DRAWINGS

In the following the disclosure will be described in greater detail by means of preferred embodiments with reference to the accompanying drawings, in which.

DETAILED DESCRIPTION

Figure 1:
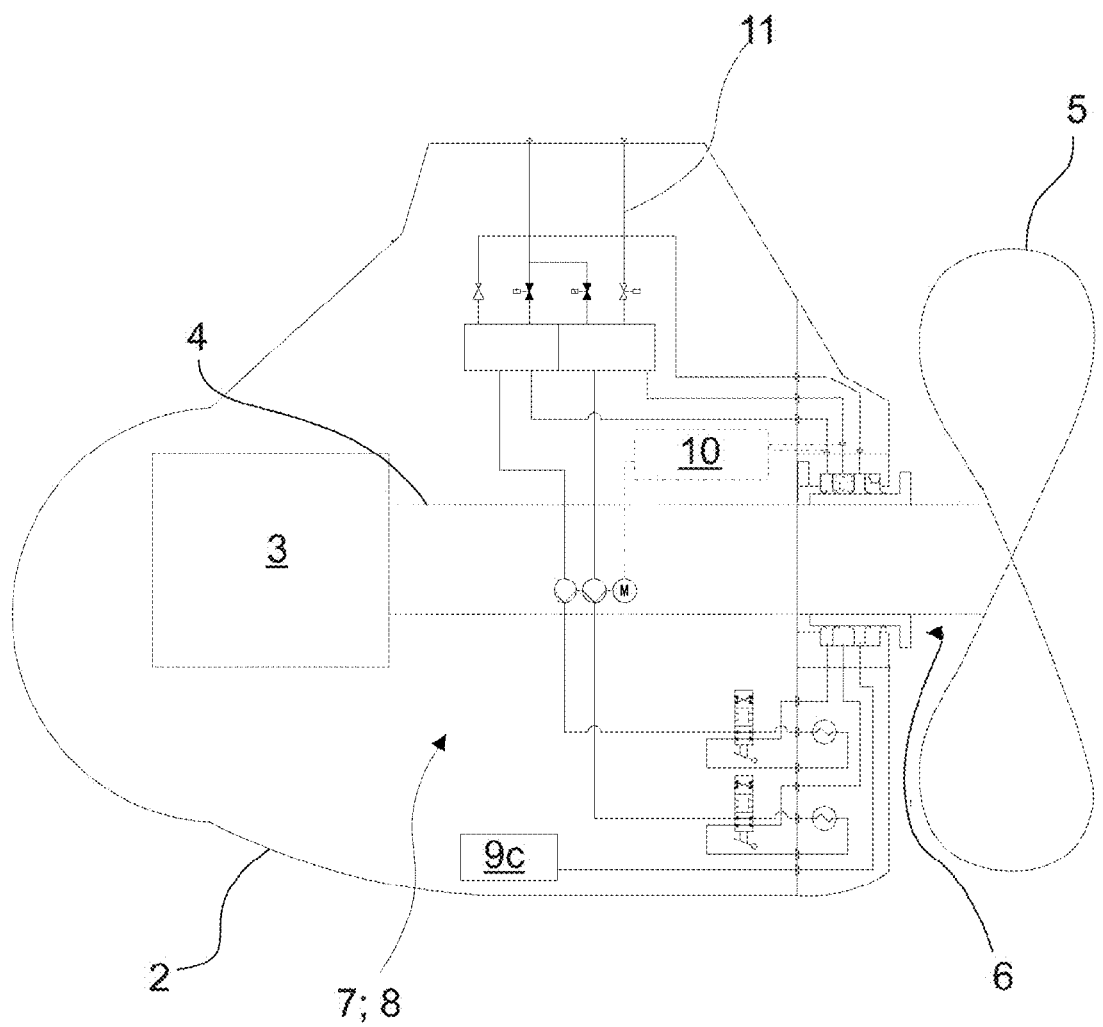
FIG. 1 is a schematic representation of a propulsion unit according to an embodiment of the present disclosure.

FIG. 1 is a schematically represent a propulsion unit according to an embodiment of the present disclosure. Particularly, the propulsion unit 1 is intended to be attached to a marine vessel beneath the hull thereof. The propulsion unit 1 has a shell structure, i.e., a casing, in which a propulsion motor 3 is housed. A propeller 5 is arranged outside the shell structure 2 and is coupled to the propulsion motor 3 with a propeller shaft 4. The propeller shaft 4 penetrates through the shell structure 2, while a shaft seal arrangement 6 seals the inside of the shell structure 2 from an outside thereof the interface of the propeller shaft 4 and the shell structure 2. A first lubrication arrangement 7 and a second lubrication arrangement 8 are provided for lubricating and cooling the shaft seal arrangement 6, while a control unit 10 is provided for controlling said lubrication arrangement 7, 8.

Figure 2:
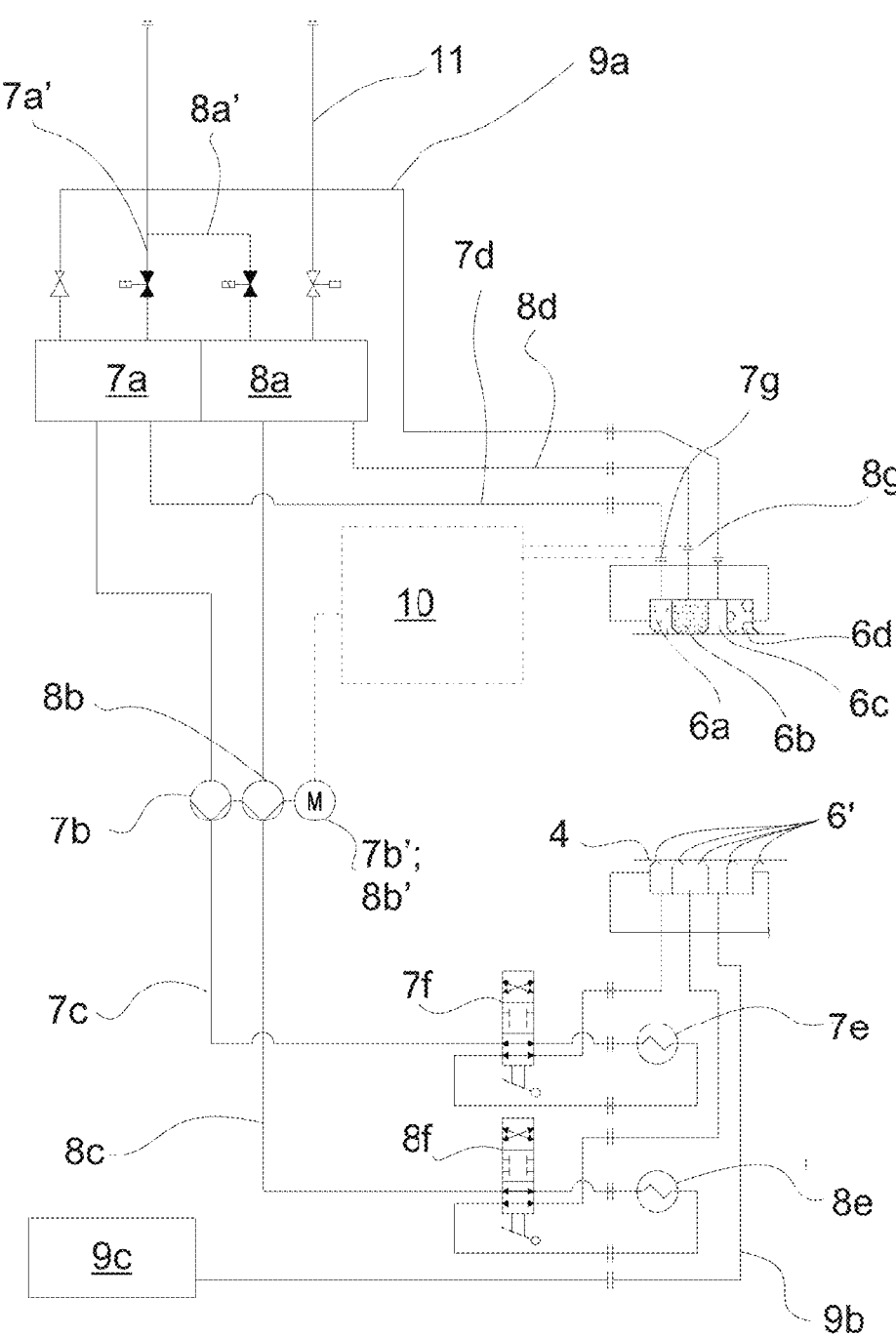
FIG. 2 is more detailed schematic representation of FIG. 1.

FIG. 2 is more detailed schematic representation of the first lubrication arrangement, the second lubrication arrangement, and other entities associated thereto, of the embodiment illustrated in FIG. 1. Particularly, the shaft seal arrangement 6 comprises a plurality of seal lips 6' engaging with propeller shaft 4. A first seal chamber 6a is delimited between adjacent axially adjacent seal lips 6' and the propeller shaft 4. In the embodiment of FIG. 2, the first seal chamber is also an axially innermost seal chamber. A second seal chamber 6b is also delimited between axially adjacent seal lips 6' and the propeller shaft 4. In the illustrated embodiment, the second seal chamber 6b is axially adjacent to the first seal chamber 6a, i.e., they are separated by a mutual seal lip. A third seal chamber 6c is also delimited between axially adjacent seal lips 6' and the propeller shaft 4. In the illustrated embodiment, the third seal chamber 6c is axially adjacent to the second seal chamber 6b, i.e., they are separated by a mutual seal lip 6'. A fourth seal chamber 6d is also delimited between axially adjacent seal lips 6' and the propeller shaft 4. In the illustrated embodiment, the fourth seal chamber 6c is an axially outermost seal chamber and axially adjacent to the third seal chamber 6c, i.e., they are separated by a mutual seal lip 6'.

The first seal chamber 6a is associated to a first lubrication arrangement 7, such that a first lubricant lubricates and cools the first seal chamber and the seal lips 6' associated thereto. Particularly, the first lubricant from a first lubricant reservoir 7a, provided as a separate tank, is circulated through the first seal chamber 6a by a first lubricant circulator 7b, after which the first lubricant is again returned to the first lubricant reservoir 7a. Before entering the first seal chamber 6a, the first lubricant is conducted through a first heat exchanger 7e, which is at least partly in contact with the environment surrounding the shell structure, such that thermal exchange between the first lubricant and the surrounding environment is achieved.

A first bypass valve 7*f* is also provided in connection with the first heat exchanger, such that the first lubricant can be directed past the first heat exchanger 7*e*, e.g., in case of failure thereof, thereby preventing the risk of lubricant leakage to the surrounding environment. In the illustrated embodiment, the first bypass valve 7*f* also provides a closed position, in which first lubricant circulation is halted altogether. The first lubricant arrangement is also provided with a first sensor 7*g*. In the illustrated embodiment, the first sensor 7*g* is a temperature sensor arranged downstream of the first seal chamber 6*a*, although other types of sensors and placements thereof may be envisaged. The first sensor 7*g* is coupled to a control unit 10, which adjusts the output flow of the first lubricant circulator 7*b* by controlling a circulator motor 7*b'* driving the first lubricant circulator.

In a similar manner, the second seal chamber 6*b* is associated to a second lubrication arrangement 8, such that a second lubricant lubricates and cools the second seal chamber and the seal lips 6' associated thereto. Particularly, the second lubricant from a second lubricant reservoir 8*a*, provided as a separate tank is circulated through the second seal chamber 6*b* by a second lubricant circulator 8*b*, after which the second lubricant is again returned to the second lubricant reservoir 8*a*. Before entering the second seal chamber 6*b*, the second lubricant is conducted through a second heat exchanger 8*e*, which is at least partly in contact with the environment surrounding the shell structure, such that thermal exchange between the second lubricant and the surrounding environment is achieved. A second bypass valve 8*f* is also provided in connection with the second heat exchanger, such that the second lubricant can be directed past the second heat exchanger 8*e*, e.g., in case of failure thereof, thereby preventing the risk of lubricant leakage to the surrounding environment. In the illustrated embodiment, the second bypass valve 8*f* also provides a closed position, in which second lubricant circulation is halted altogether. The second lubricant arrangement 8 is also provided with a second sensor 8*g*. In the illustrated embodiment, the second sensor 8*g* is a temperature sensor arranged downstream of the second seal chamber 6*b*, although other types of sensors and placements thereof may be envisaged. The second sensor 8*g* is couple to a control unit 10, which adjusts the output flow of the second lubricant circulator 8*b* by controlling a circulator motor 8*b'* driving the second lubricant circulator.

In the illustrated embodiment, the first lubricant reservoir 7*a* is coupled to a first lubricant supply line 7*a'* for filling said first lubricant reservoir 7*a*. Correspondingly, the second lubricant reservoir 8*a* is coupled to a second lubricant supply line 8*a'* for filling said second lubricant reservoir 8*a*.

In the illustrated embodiment, both the first lubricant circulator 7*b* and the second lubricant circulator 8*b* are driven by the same circulator motor 7*b'*, 8*b'*, although separate motors may also be implemented.

In the illustrated embodiment, an air supply line 11 is coupled to the second lubricant reservoir 8*a*, and also to the first lubricant reservoir 7*a* via a respective regulator so as to set a desired reservoir pressure within the first lubricant reservoir 7*a*, lower than that of the air supply line 11.

Furthermore, the air supply line 11 is also coupled to the third seal chamber 6*c* along a regulator line 9*a*, such that a pressure prevailing within the third seal chamber 6*c* may be regulated. That is, the pressure prevailing within the third seal chamber is set, so as to counteract a hydrostatic pressure prevailing in the environment surrounding the shell structure 2, i.e. to smoothen out the pressure differential acting over the seal arrangement 6. Although other arrangement are possible, the enclosed drawings illustrate an embodiment in which the pressure prevailing in the second lubricant reservoir 8*a* and the third seal chamber 6*c* are governed by the pressure prevailing in the air supply line 11, while a separate regulator for governing the pressure prevailing in the first lubricant reservoir 7*a* is provided.

The third seal chamber 6*c* is further coupled to a drainage reservoir 9*c* with a drainage line 9*b*. This enables any water the fourth seal chamber 6*d* or lubricant from the second seal chamber 6*b* leaking over to the third seal chamber 6*c* to be drained therefrom. Effectively, any lubricant from the second seal chamber 6*b* is prevented from contaminating environment surrounding the shell structure 2.

When in use, the first seal chamber 6*a* and second seal chamber 6*b* are chiefly occupied by the first lubricant and the second lubricant, respectively. The third seal chamber 6*c* is chiefly occupied by air fed via the regulator line 9*a*, and the fourth seal chamber 6*d* is chiefly occupied by water from the surrounding environment.

Figure 3:
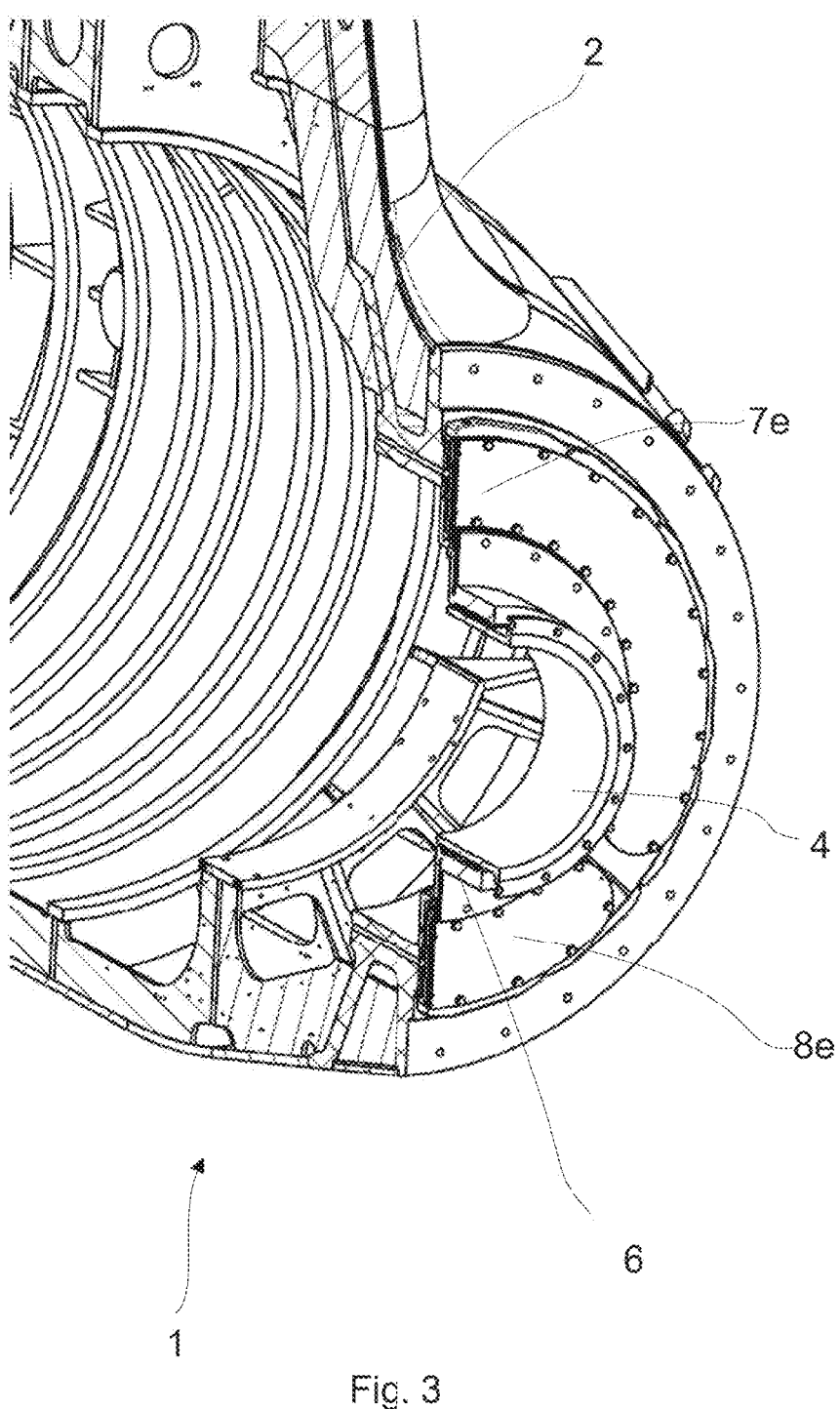
FIG. 3 is a partially cut view of a propulsion unit according to an embodiment of the present disclosure as seen from a perspective view.

FIG. 3 is a partially cut view of a propulsion unit 1 according to an embodiment of the present disclosure as seen from a perspective view. Particularly FIG. 3 illustrates the shell structure 2 defining an inner space, housing components of the propulsion unit 1, as discussed above. Furthermore, a portion of the shaft 4, namely a sleeve thereof can be seen extending through the shell structure 2. The seal arrangement 6 is provided surrounding the propeller shaft 4. Moreover, portions of the first heat exchanger 7*e* and the second heat exchanger 8*e* can be seen on an end face of the shell structure 2 surrounding the propeller shaft 4.

Figure 4:
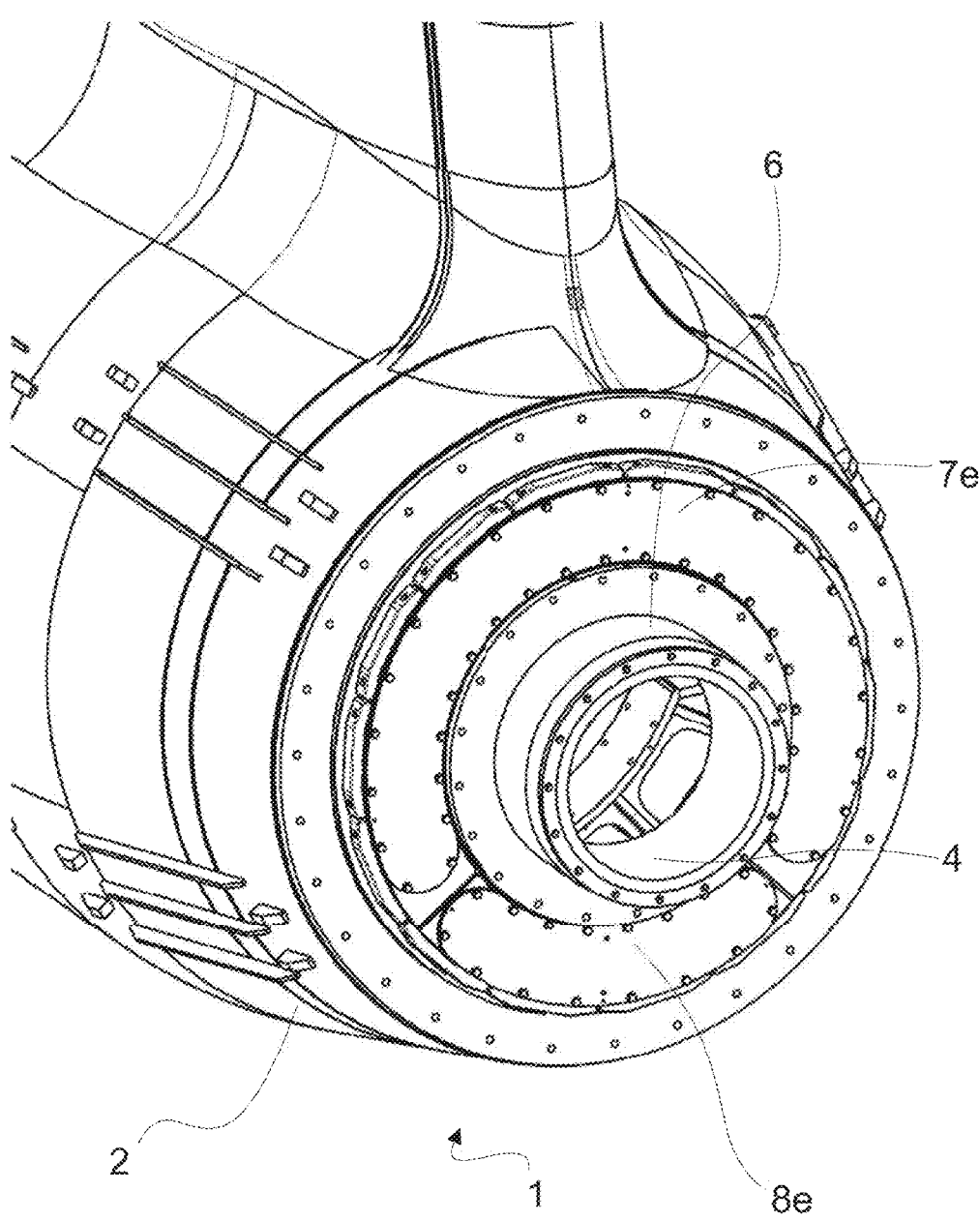
FIG. 4 is a perspective view of the propulsion unit shown in FIG. 3.

FIG. 4 is a perspective view of the propulsion unit shown in FIG. 3. FIG. 4 more clearly illustrates the arrangement, in which the first heat exchanger 7*e* and second heat exchanger 8*e* annularly surround the propeller shaft 4.

Figure 5:
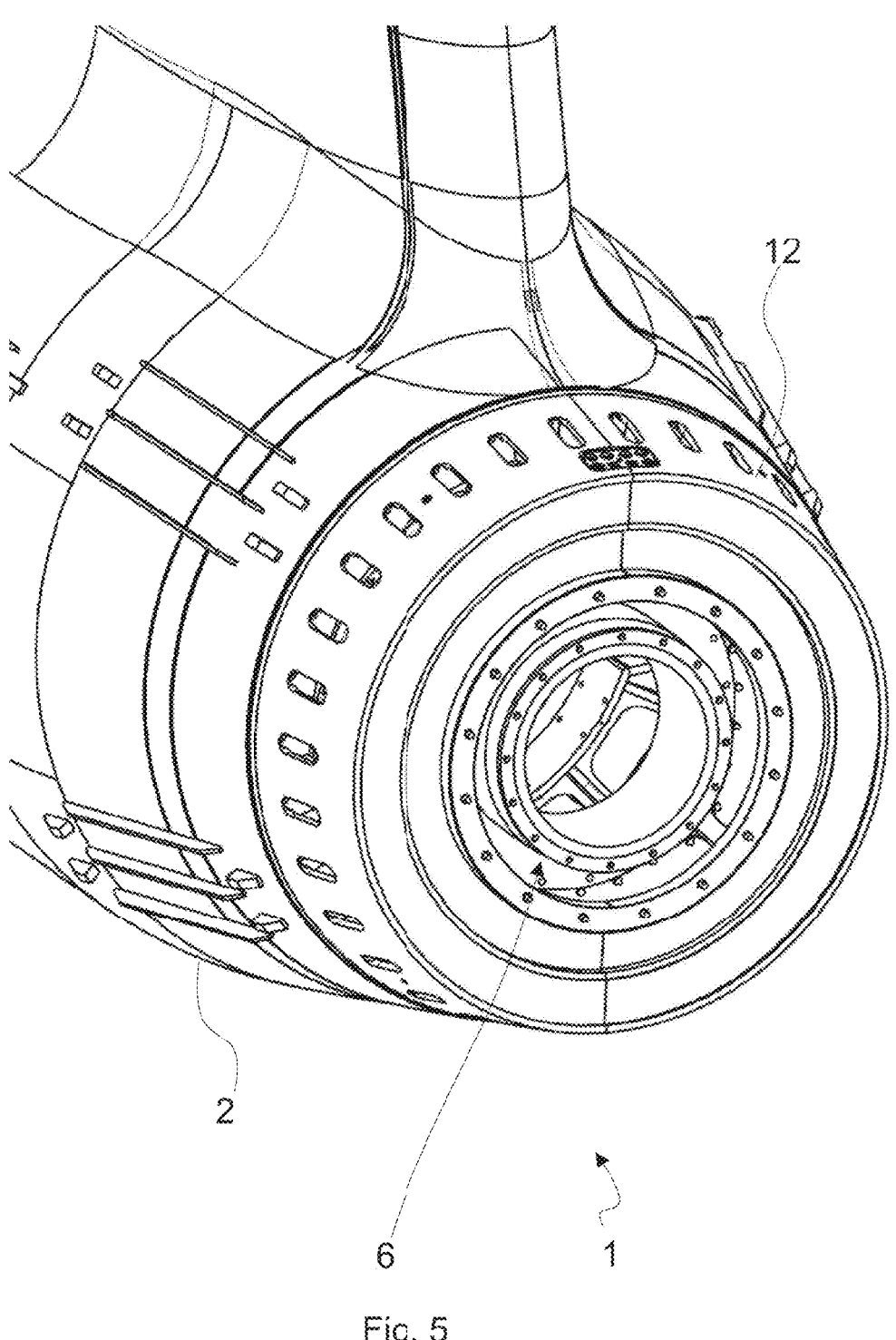
FIG. 5 is a perspective view of the propulsion unit shown in FIG. 3 with heat exchangers being covered.

FIG. 5 is a perspective view of the propulsion unit shown in FIG. 3 and FIG. 4, with the exception of the first heat exchanger 7*e* and second heat exchanger 8*e* being covered by a separate cowling in the form of a rope guard 12.

Although the annexed drawings discuss the present disclosure in connection with an embodiment employing a first lubrication arrangement 7 and second lubrication arrangement 8, it should be understood that the present disclosure encompasses propulsion units implemented with a single lubrication arrangement, or alternatively, with more than two lubrication arrangements.

The invention claimed is:

1. A propulsion unit for a marine vessel, the propulsion unit comprising:
    a shell structure mountable below a hull of the marine vessel such that the shell structure is at least partially immersed in water, when in use;
    a shaft extending between an inside and an outside of the shell structure through an opening provided thereat;
    a propeller coupled to the shaft outside the shell structure so as to be rotatable by the shaft;
    a shaft seal arrangement comprising a plurality of seal lips axially spaced apart from each other and engaging the outer circumference of the shaft, such that at least a first seal chamber is delimited between adjacent seal lips and the outer circumference of the shaft, and
    a first lubrication arrangement, in turn, comprising:
        a first lubricant circulator;
        a first lubricant feed line for conducting a first lubricant to the first seal chamber via the first lubricant circulator, and a first lubricant return line for conducting said first lubricant from the first seal chamber back to the first lubricant circulator, wherein the first lubrication arrangement further includes a first lubricant heat exchanger arranged at least partly in contact with an outside environment of the shell structure for conducting the first lubricant through the first heat exchanger and for transferring heat from the first lubricant to the outside environment of the shell structure, and wherein a portion of the first heat exchanger outside the shell structure is provided on an outside end surface of the shell structure facing the propeller.

2. The propulsion unit according to claim 1, wherein the shaft seal arrangement comprises the plurality of seal lips, such that additionally at least a second seal chamber is delimited between the adjacent seal lips and the outer circumference of the shaft, and a second lubrication arrangement, in turn, comprising:
    a second lubricant circulator;
    a second lubricant feed line for conducting a second lubricant to the second seal chamber via the second lubricant circulator;
    a second lubricant return line for conducting said second lubricant from the second seal chamber back to the second lubricant circulator, and
    a second lubricant heat exchanger arranged at least partly outside of the shell structure for conducting said second lubricant therethrough and for transferring heat from the second lubricant to an outside environment of the shell structure.

3. The propulsion unit according to claim 2, wherein the shaft seal arrangement comprises the plurality of seal lips, such that additionally at least a third seal chamber is delimited between the adjacent seal lips and the outer circumference of the shaft, and, wherein the propulsion unit further comprises a regulator in fluid communication with the third seal chamber, such that a fluid pressure prevailing within the third seal chamber may be regulated with said regulator.

4. The propulsion unit according to claim 3, wherein the shaft seal arrangement comprises the plurality of seal lips, such that additionally at least a fourth seal chamber is delimited between the adjacent seal lips and the outer circumference of the shaft, and, wherein the fourth seal chamber is an axially outermost seal chamber, such that an axially outermost seal lip associated with the fourth seal chamber is in direct contact with surrounding water, when in use.

5. The propulsion unit according to claim 2, wherein a portion of the second heat exchanger outside the shell structure is provided on an outside end surface of the shell structure facing the propeller, said portion of the second heat exchanger preferably being at least partially covered by a cowling.

6. The propulsion unit according to claim 1, wherein the first lubrication arrangement comprises a first sensor configured to produce a first sensor signal indicative of properties of the first lubricant, the first sensor being coupled to a control unit configured to adjust output flow of the first lubricant circulator based on the first sensor signal.

7. The propulsion unit according to claim 6, wherein the control unit is configured to adjust output flow of the first lubricant circulator by controlling an associated circulator motor configured to drive said first lubricant circulator.

8. The propulsion unit according to claim 6, wherein the first sensor is provided as a first temperature sensor configured to produce a first sensor signal indicative of a first lubricant temperature, and wherein the control unit is configured to increase output flow of the first lubricant circulator if the first sensor signal indicates an excessive first lubricant temperature, and/or decrease output flow of the first lubricant circulator if the first sensor signal indicates insufficient first lubricant temperature, or the first sensor is provided as a first pressure sensor indicative of a first lubricant pressure prevailing in the first seal chamber, and wherein the control unit is configured to increase output flow of the first lubricant circulator if the first sensor signal indicates an insufficient first lubricant pressure, and/or decrease output flow of the first lubricant circulator if the first sensor signal indicates excessive first lubricant pressure.

9. The propulsion unit according to claim 2, wherein the second lubrication arrangement comprises a second sensor configured to produce a second sensor signal indicative of properties of the second lubricant, the second sensor being coupled to a control unit configured to adjust output flow of the second lubricant circulator based on the second sensor signal.

10. The propulsion unit according to claim 9, wherein the control unit is configured to adjust output flow of the second lubricant circulator by controlling an associated circulator motor configured to drive said second lubricant circulator.

11. The propulsion unit according to claim 9, wherein either or both of the second sensor is provided as a second temperature sensor configured to produce a second sensor signal indicative of a second lubricant temperature, and wherein the control unit is configured to increase output flow of the second lubricant circulator if the second sensor signal indicates an excessive second lubricant temperature, and/or decrease output flow of the second lubricant circulator if the second sensor signal indicates insufficient second lubricant temperature, or the second sensor is provided as a second pressure sensor indicative of a second lubricant pressure prevailing in the second seal chamber, and wherein the control unit is configured to increase output flow of the second lubricant circulator if the second sensor signal indicates an insufficient second lubricant pressure, and/or decrease output flow of the second lubricant circulator if the second sensor signal indicates excessive second lubricant pressure.

12. The propulsion unit according to claim 2, wherein both the first lubricant circulator and the second lubricant circulator are driven by a shared circulator motor.

13. The propulsion unit according to claim 1, wherein further comprising a propulsion motor arranged within the shell structure, and wherein the propulsion motor is rotatably coupled with the shaft such that the propeller is rotatable by the propulsion motor.

14. A marine vessel comprising a propulsion unit, the propulsion unit having:

a shell structure mountable below a hull of the marine vessel such that the shell structure is at least partially immersed in water, when in use;

a shaft extending between an inside and an outside of the shell structure through an opening provided thereat;

a propeller coupled to the shaft outside the shell structure so as to be rotatable by the shaft;

a shaft seal arrangement comprising a plurality of seal lips axially spaced apart from each other and engaging the outer circumference of the shaft, such that at least a first seal chamber is delimited between adjacent seal lips and the outer circumference of the shaft, and a first lubrication arrangement, in turn, having:

a first lubricant circulator;

a first lubricant feed line for conducting a first lubricant to the first seal chamber via the first lubricant circulator, and a first lubricant return line for conducting said first lubricant from the first seal chamber back to the first lubricant circulator, wherein the first lubrication arrangement further comprises a first lubricant heat exchanger arranged at least partly in contact with an outside environment of the shell structure for conducting the first lubricant through the first heat exchanger and for transferring heat from the first lubricant to the outside environment of the shell structure, and wherein a portion of the first heat exchanger outside the shell structure is provided on an outside end surface of the shell structure facing the propeller.

15. The propulsion unit according to claim 2, wherein the first lubrication arrangement comprises a first sensor configured to produce a first sensor signal indicative of properties of the first lubricant, the first sensor being coupled to a control unit configured to adjust output flow of the first lubricant circulator based on the first sensor signal.

\* \* \* \* \*